United States Patent
Swiderski

(10) Patent No.: US 11,879,423 B2
(45) Date of Patent: Jan. 23, 2024

(54) SELF-REGULATING WATER TURBINE RUNNER, WATER TURBINE EQUIPPED WITH SUB-RUNNER LOCATED UPSTREAM OF THE MAIN RUNNER AND WATER TURBINE COMPRISING THE SAME

(71) Applicant: COMPOSITE HYDRAULIC TURBINE OTTAWA INC., Ottawa (CA)

(72) Inventor: Jacek Swiderski, Ottawa (CA)

(73) Assignee: COMPOSITE HYDRAULIC TURBINE OTTAWA INC., Ottawa (CA)

( * ) Notice: Subject to any disclaimer, the term of this patent is extended or adjusted under 35 U.S.C. 154(b) by 0 days.

(21) Appl. No.: 17/771,394

(22) PCT Filed: Oct. 22, 2020

(86) PCT No.: PCT/CA2020/051416
§ 371 (c)(1),
(2) Date: Apr. 22, 2022

(87) PCT Pub. No.: WO2021/077222
PCT Pub. Date: Apr. 29, 2021

(65) Prior Publication Data
US 2022/0397088 A1     Dec. 15, 2022

Related U.S. Application Data

(60) Provisional application No. 62/925,801, filed on Oct. 25, 2019.

(51) Int. Cl.
*F03B 3/14*     (2006.01)

(52) U.S. Cl.
CPC .................. *F03B 3/145* (2013.01)

(58) Field of Classification Search
None
See application file for complete search history.

(56) References Cited

U.S. PATENT DOCUMENTS 1,552,074 A * 9/1925 Moody ............... F03B 15/02
                                                               415/43
1,858,566 A    5/1932  Terry
(Continued)

FOREIGN PATENT DOCUMENTS

CA         3053285 A1    8/2018
CN      101915196 A    12/2010
(Continued)

OTHER PUBLICATIONS

"Viktor Kaplan", Wikipedia, 2016, pp. 1-2, Accessed Nov. 2022. [Retrieved from https://en.wikipedia.org/w/index.php?title=Viktor_Kaplan&oldid=1087653017].

*Primary Examiner* — Michael Lebentritt
(74) *Attorney, Agent, or Firm* — The Webb Law Firm

(57) ABSTRACT

The present invention provides a turbine sub-runner that is positioned to be within the vortex zone of a turbine wicket gates (zone "S-R", FIG. 1). The sub-runner includes at least two sub-runner blades, configured to monitor the relative flow of the vortex created by the wicket gates. A control mechanism is connected to the sub-runner shaft via gear and threaded interface, and is capable of transferring the relative (vs main-runner) rotational energy of the sub-runner into angular movement of the main runner blades. As the sub-runner interacts with the changing conditions of the main vortex within the zone "S-R", it will act to automatically regulate, adjust, and control the angle of the main runner blades to optimize the performance of the turbine. The sub-runner uses the energy of the vortex existing in the zone "S-R" to perform the monitoring, regulation, adjustment and (Continued)

control of the main runner through regulating angular position of main runner blades.

10 Claims, 5 Drawing Sheets

(56) References Cited

U.S. PATENT DOCUMENTS

| | | | |
|---|---|---|---|
| 1,989,966 A * | 2/1935 | Biggs | F03B 3/183 |
| | | | 416/243 |
| 3,187,189 A | 6/1965 | Lang | |
| 3,190,076 A * | 6/1965 | Meyer | F16D 33/14 |
| | | | 60/351 |
| 5,120,194 A * | 6/1992 | Nichols | F03B 3/12 |
| | | | 415/167 |
| 5,947,679 A | 9/1999 | Cybularz et al. | |
| 8,763,625 B1 * | 7/2014 | Carter | F04F 10/00 |
| | | | 137/149 |

FOREIGN PATENT DOCUMENTS

| | | |
|---|---|---|
| CN | 201714558 U | 1/2011 |
| CN | 103807084 A | 5/2014 |
| CN | 208950760 U | 6/2019 |
| JP | H11159433 A | 6/1999 |
| WO | 2013029909 A1 | 3/2013 |
| WO | 2018152639 A1 | 8/2018 |

\* cited by examiner

SELF-REGULATING WATER TURBINE RUNNER, WATER TURBINE EQUIPPED WITH SUB-RUNNER LOCATED UPSTREAM OF THE MAIN RUNNER AND WATER TURBINE COMPRISING THE SAME

CROSS-REFERENCE TO RELATED APPLICATIONS

This application is the United States national phase of International Application No. PCT/CA2020/051416 filed Oct. 22, 2020, and claims priority to U.S. Provisional Patent Application No. 62/925,801 filed Oct. 25, 2019, the disclosures of which are hereby incorporated by reference in their entirety.

BACKGROUND OF THE INVENTION

Field of the Invention

The present invention pertains to the field of water turbine electrical power generation, water turbine control and performance optimization. In particular, the present invention relates to a self-regulating water turbine runner, water turbine equipped with sub-runner located upstream of the main runner and water turbine comprising the same.

Description of Related Art

Electricity can be generated by running a flowing water source through a turbine. This hydroelectric power may then be diverted into the general power grid to be consumed by an electricity consumer. Turbine design has undergone several improvements since its original inception in order to improve the efficiency of turbine electricity generation.

Water turbines produce electricity when the potential and kinetic energy of moving water is converted into mechanical energy. Water may be diverted from a lake or river, and permitted to enter a turbine through wicket gates. Wicket gates are able to open and close in order to control the amount of water that enters the turbine. The wicket gates may be controlled externally and have their orientation altered to suit the water conditions in which the turbine is operating. After water enters the turbine through the wicket gates it passes over the main runner, which consists of main runner blades and a main runner hub. The main runner blades can be controlled in order to suit the water conditions in which the turbine is operating. For example, the main runner blade angles may be adjusted in order to optimize the performance of the turbine. When the water runs over the main runner blades, the kinetic energy of the water will be converted into mechanical energy as the main runner blades rotate in response to the running water. As the main runner blades rotate, they in turn cause a main runner shaft to rotate. This main runner shaft is connected to a generator, which converts the mechanical energy from the shaft into electrical energy. After the water has passed over the main runner blades, it will exit the turbine out of the draft tube to rejoin the source from which it was originally diverted.

Double-regulated or regulated water turbines include a main runner equipped with adjustable main runner blades. The main runner blade angle is adjustable using an external controlling device, in response to the amount of water flowing through the wicket gate openings. These adjustable main runner blades extend turbine operating range from use at 70%-100% of the full load (in case of regulated wicket gates only), to an operating range of 20%-100% of full load (when regulation by adjustable runner blades is added). This improvement is due to a correlation (called a "cam table") between the main runner blade angle and the wicket gate openings, which was established based on model and field testing. Optimal turbine performance is achieved when the relative position of wicket gates and main runner blades follow the positions as defined within corresponding cam table. The process of controlling the blade and gate position is performed by mechanical or hydraulic coupling that is controlled by an external device, requiring power from an external energy source.

Water flow through the turbine can be measured and analyzed to provide data about the turbine and energy production efficiency. For example, water flow patterns leaving the main runner may carry information that can be used to maximize efficiency of the turbine.

An adjustable blade propeller water turbine was invented by Victor Kaplan and patented in 1912, called Kaplan turbine. The adjustable blade mixed-flow turbine was invented by Paul Deriaz and patented in 1926, called Deriaz turbine.

An attempt to develop a self-regulating Kaplan turbine was made in 1932 by R. V. Terry, and patented in 1932. This unit executed an adjustment of the runner blades to best suit operating conditions based on the differential pressure between the draft tube and the inlet casing. The piston was mounted inside the rotating runner hub and was connected through the links to adjust the runner blade angle. The whole idea was based on an assumption that the differential pressure between the inlet casing and the draft tube carries information on how to adjust the runner blades to optimize turbine efficiency, as well as providing the energy to execute movement of runner blades. The effectiveness of this method is not known, and it is not commonly used.

WO2018152639 describes a self-regulating water turbine based on the actions of a sub-runner installed downstream of the main-runner.

Therefore, there is still a need for turbine that provides for self-regulation of the main runner blades responsive to operating conditions as determined by measuring water flow information. There is a further need for a turbine that operates without the need of an external energy to perform regulation of the main runner blades, which is able to automatically alter the angle of the main runner blades to optimize the performance of the turbine.

This background information is provided to reveal information believed by the applicant to be of possible relevance to the present turbine sub-runner. No admission is necessarily intended, nor should be construed, that any of the preceding information constitutes prior art against the present turbine sub-runner.

SUMMARY OF THE INVENTION

An object of the present invention is to provide a self-regulating water turbine runner, water turbine equipped with sub-runner located upstream of the main runner and water turbine comprising the same. In accordance with an aspect of the present invention, there is provided a turbine sub-runner configured to be located within just upstream of a turbine main runner (zone "S-R", FIG. 1), comprising at least two sub-runner blades, configured to respond to the relative flow of the vortex of the distributor (wicket gates); a sub-runner shaft connected to the at least two sub-runner blades and to the sub-runner control mechanism; and a sub-runner control mechanism, capable of transferring the rotational energy of the sub-runner blades into angular movement of the main runner blades.

In accordance with another aspect of the invention, there is provided turbine sub-runner for location within the zone between the outlet from wicket gates and inlet to a main-runner, the turbine sub-runner comprising a sub-runner shaft; a sub-runner hub positioned upstream of the main runner, the sub-runner hub connected to the sub-runner hub; and at least two sub-runner blades connected to the sub-runner hub, the at least two sub-runner blades configured to be response to the relative flow located in the zone resulting from combination of positions of wicket gates and main-runner blades; wherein the sub-runner is operatively connected to a control mechanism that transfers the rotational energy of the sub-runner into angular movement of the main runner blades and sub-runner blades.

In accordance with another aspect of the present invention, there is provided a Kaplan or Deriaz type turbine comprising at least two main runner blades, a main runner hub, connected to and facilitating the rotation of the main runner blades and the main runner shaft, a main runner shaft connected to the at least two main runner blades and to a turbine power generator component, a turbine power generator component, at least two sub-runner blades, positioned below the turbine main runner and configured to monitor the relative flow of the vortex of a turbine main runner, a sub-runner hub positioned below the at least two sub-runner blades, connected to and facilitating the rotation of the sub-runner blades and the sub-runner shaft, a sub-runner shaft connected to the at least two sub-runner blades and to the sub-runner control mechanism, and a sub-runner control mechanism, capable of transferring the rotational energy of the sub-runner into angular movement of the main runner blades.

In accordance with another aspect of the present invention, there is provided a kit to retrofit a Kaplan or Deriaz type turbine with a turbine sub-runner.

BRIEF DESCRIPTION OF THE DRAWINGS

Embodiments of the present invention will be better understood in connection with the following Figures, in which:

FIG. 2A illustrates a straight-flow turbine ($\alpha$=90 deg, $\beta$=0 deg). FIG. 2B illustrates a Classical Kaplan arrangement ($\alpha$=0 deg, $\beta$=0 deg). FIG. 2C illustrates a classical double regulated mixed-flow turbine (so-called: Deriaz) arrangement ($\alpha$=0 deg, $\beta$>0 deg).

DESCRIPTION OF THE INVENTION

The present invention provides a self-regulating water turbine runner, water turbine equipped with sub-runner located upstream of the main runner and water turbine comprising the same.

Turbine Sub-Runner Overview

The turbine sub-runner of the invention is positioned upstream of the main runner and comprises at least two sub-runner blades connected to a sub-runner hub, and a sub-runner shaft, optionally the sub-runner shaft is a section of main-runner hub.

Figure 1:
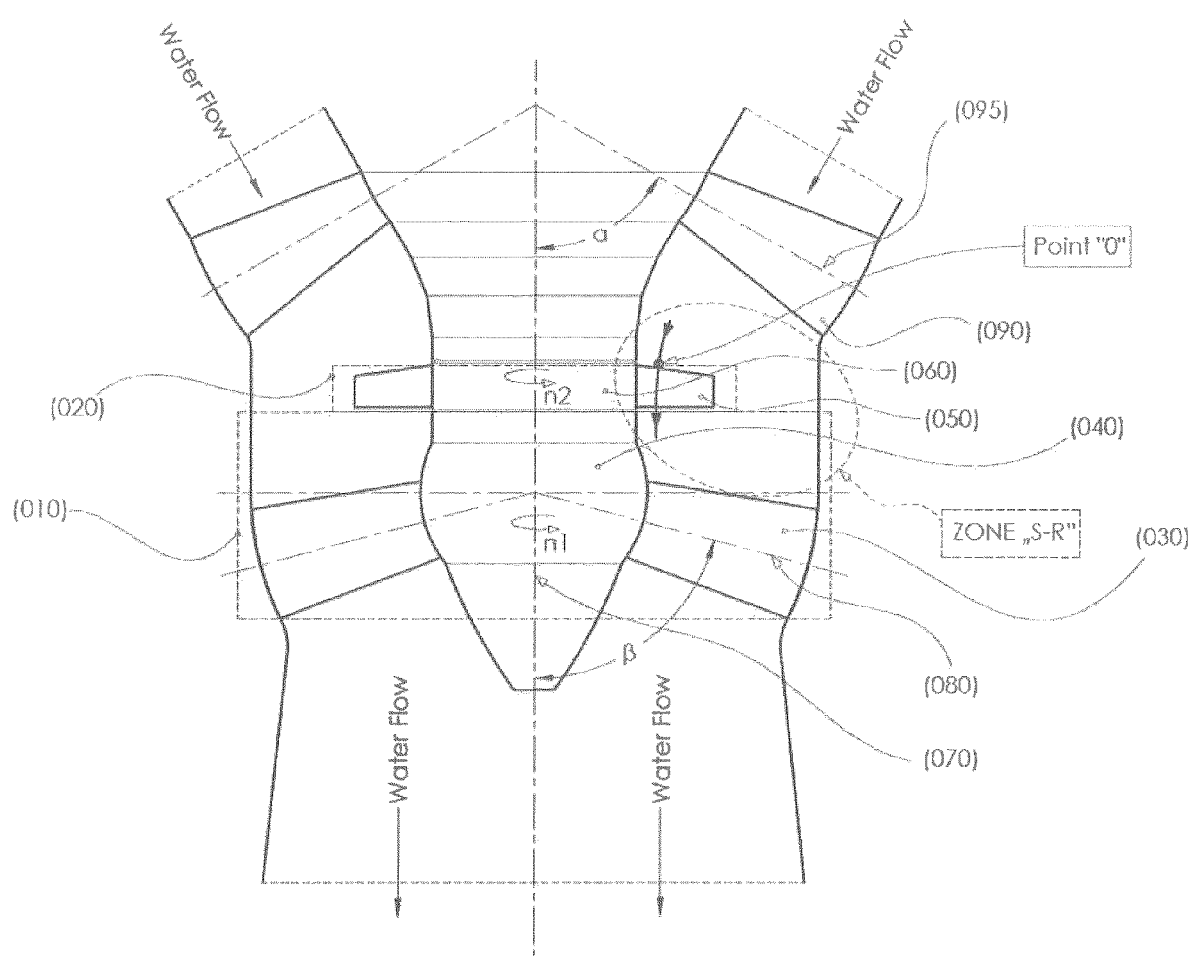
FIG. 1 illustrates a general arrangement of a Double-regulated turbine (equipped with adjustable blades) turbine main runner equipped with a sub-runner ($\alpha$=~60 deg, $\beta$=~15 deg).
Figure 2A:
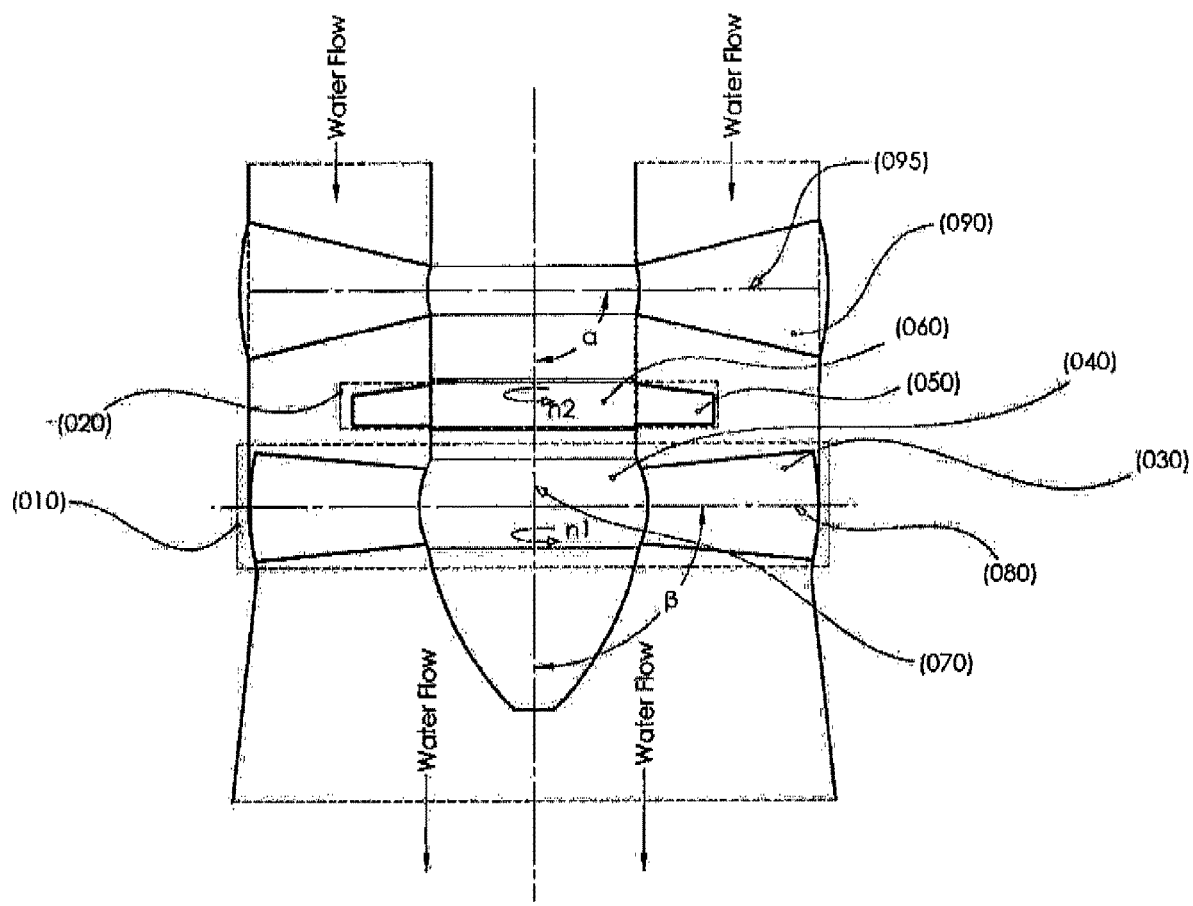
FIGS. 2A, 2B and 2C also illustrates a family of turbine configurations, where the invention will be applied, configurations within defined parameters of $\alpha$ and $\beta$.
Figure 2B:
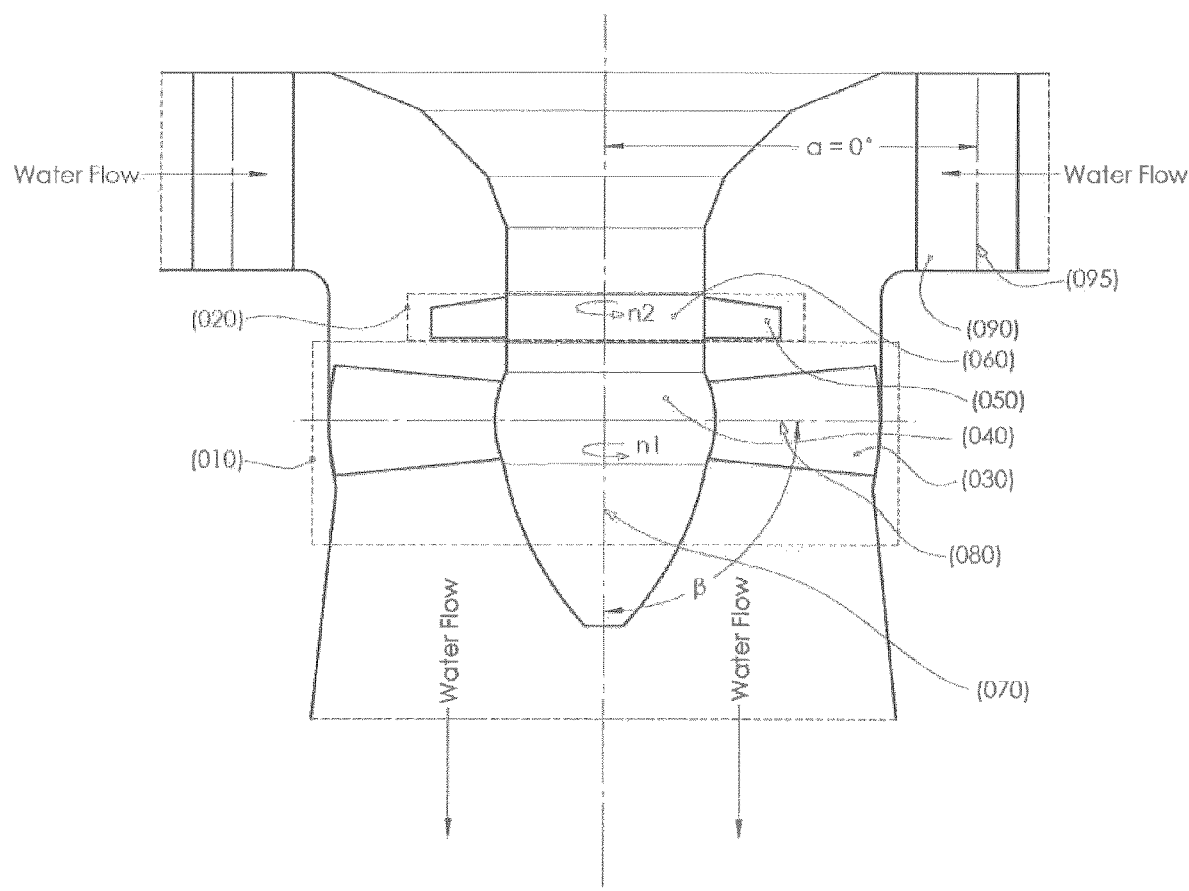
Figure 2C:
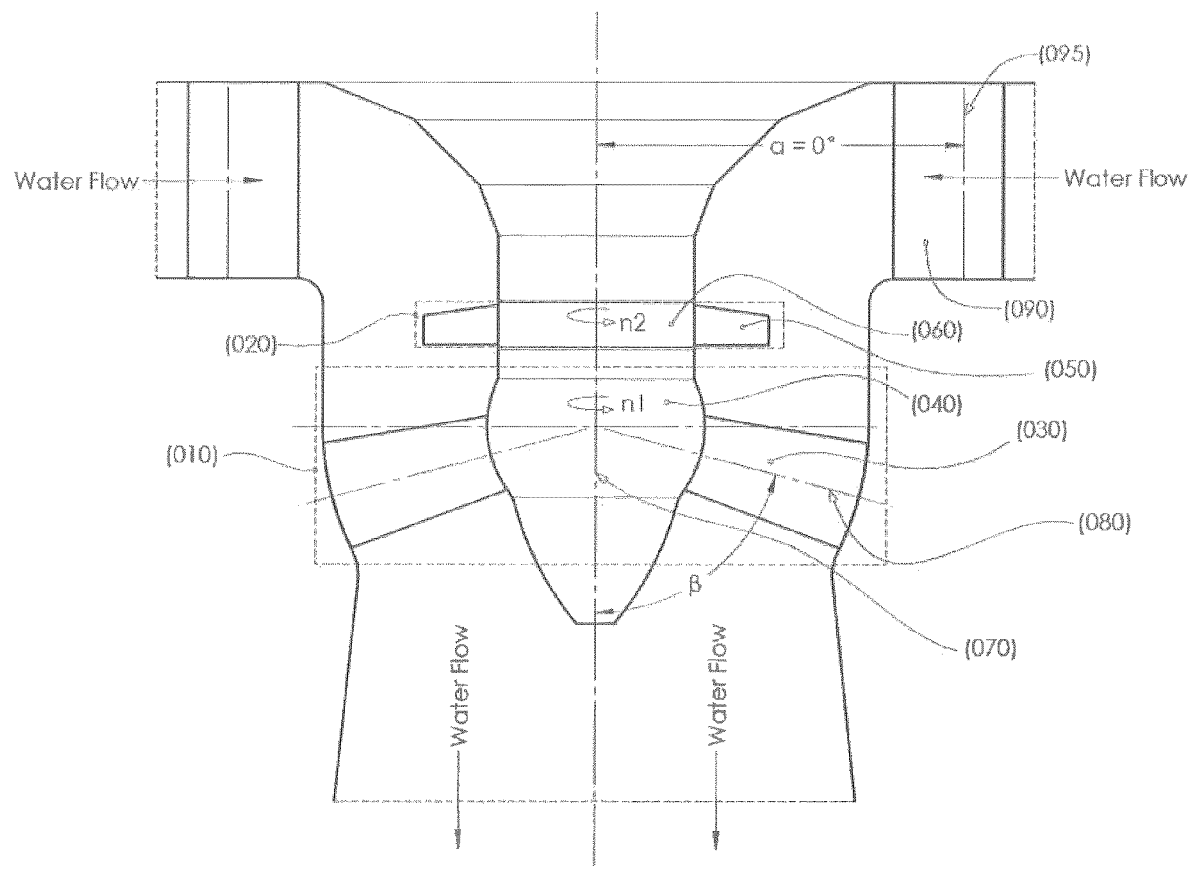

Referring to FIG. 1, the sub-runner is positioned such that its blades are within the space between wicket gates and the turbine main runner (the "S-R" zone). The sub-runner blades are configured to respond to the water flow as it is created as a result of wicket gates and the main runner blades set up. The sub-runner hub is positioned upstream of the main runner and connected to the sub-runner blades. The sub-runner shaft is operatively connected to the sub-runner blades and sub-runner hub. The sub-runner is operatively connected to the sub-runner shaft, and is capable of transferring the rotational energy of the sub-runner blades and sub-runner shaft into angular movement of the main runner blades. As the sub-runner responds to the changing conditions of the water flow as it is imposed by the wicket gates and main-runner blades, it acts to automatically regulate, adjust, and control the angle of the main runner blades to optimize the performance of the turbine. The sub-runner uses the energy of the sub-runner blades to perform the monitoring, regulation, adjustment and control of the main runner.

In one embodiment, the water flow behavior at the area located just downstream of the wicket gates (and still upstream of the runner blades) may be analyzed. The water leaving the wicket gates just before entering the main runner has a very specific and systematic behavior depending on the proximity to the ideal operating point at a given turbine load.

If the main runner blades are positioned at too small of an angle, the velocity triangle illustrating flow of water at the entrance to the sub-runner will correspond (FIG. 3) to:

c1—water velocity at absolute coordinate system (stationary relatively to the earth)

v1—water velocity in rotating frame of reference (associated with the sub-runner spinning at angular velocity of $\omega$)

u1—relative velocity resulting from velocity of rotation of the rotating frame of references associated with the sub-runner ($u1=\omega*r1$, where r1 is a distance of a water particle to the axis of rotation).

If the main runner blades are positioned at too large of an angle, the velocity triangle illustrating flow of water at the entrance to the sub-runner will correspond to:

c2—water velocity at absolute coordinate system (stationary relatively to the earth)

v2—water velocity in rotating frame of reference (associated with the sub-runner spinning at angular velocity of w)

u2—relative velocity resulting from velocity of rotation of the rotating frame of references associated with the sub-runner ($u2=\omega*r2=\omega*r1=u1$, where r1=r2 is a distance of a water particle to the axis of rotation).

The fact that the direction of water flow changes in a rotating frame of reference is a fundamental phenomenon that carries information on whether the runner blades are opened too much (vectors: c2, v2) or too little (vectors c1, v1).

In another embodiment, during a classical water turbine operation where the turbine speed remains constant, velocity triangles (vector representation of velocity of the water particle) is altered by changing main-runner blade angle (or main-runner blade pitch–main runner blade rotation around the "Axis of the main-runner blade adjustment", FIG. 1). Through an extensive tests and observations of the water behavior under various wicket gates and runner blades angles completed by application of the Computational Fluid Dynamics, it was observed that the change of runner blade pitch itself alters the flow upstream of the runner (point "0", FIG. 1) in a very specific, predictable way. This behavior of water flow can be used to adjust main-runner blade pitch (angle) in order to maximize turbine efficiency.

In one embodiment, the water flow within the zone "S-R" (FIG. 1) imposed upon the sub-runner may be used to adjust the main runner blade angle in order to maximize turbine efficiency. A sub-runner installed in the zone "S-R", may be responsive to the relative water flow which propels sub-runner blades. The sub-runner blades will in turn drive a sub-runner control mechanism which will adjust the position of main runner blades to the point where the hydrodynamic force propelling the sub-runner to have speed of its rotation ($n2$, or $\omega2$) different than speed of main-runner rotation ($n1$, or $\omega2$) diminish. Such flow character corresponds directly to most efficient turbine operation.

In one embodiment, the sub-runner automatically adjusts the position of the main runner blades. The sub-runner blades are propelled by the energy of the flow within the "S-R" zone—as described herein the flow character within the "S-R" zone provides information related to the efficiency of the turbine. The propulsion of the sub-runner blades directly drives the sub-runner control mechanism, which proportionally controls the position of the main runner blades. As the characteristics of the flow within the "S-R" zone change, the propulsion of the sub-runner blades and in turn the action of the sub-runner control mechanism will modify in direct proportion to the flow within the "S-R" zone characteristics. In this way the main runner blades are automatically controlled by the characteristics of the hydrodynamic forces as imposed upon the sub-runner, without the need for a secondary control source to perform main runner blade regulation.

In one embodiment, the sub-runner performs action such as but not limited to adjustment, control, regulation, alteration, modification, monitoring, or otherwise as understood by someone skilled in the art, on the main runner blades. This action may but is not limited to, altering the angle of the main runner blades.

In one embodiment, the wicket gates of the turbine is controlled automatically, by a turbine operator, or otherwise as would be understood by someone skilled in the art. The position of the wicket gates may be altered to suit changing conditions of the water source being used to drive the turbine. For example, a long period of heavy rain may dramatically increase the source water flow—the wicket gates may be adjusted to account for the changing character of the turbine water source.

In one embodiment, when the wicket gates of a turbine are adjusted, the flow of water through the turbine is also change. The new water flow character through the turbine will impact the character of the flow within the "S-R" zone. The sub-runner is able to react to ongoing changes of the flow within the "S-R" zone and adjust the main runner blades accordingly to optimize turbine performance. In this way the sub-runner is able to maintain turbine optimization by perform ongoing adjustment (iterative adjustment) of the main runner blades, as a result of changes to the water flow through the turbine caused by wicket gate alteration.

In one embodiment, the sub-runner adjusts the position of the main runner blades using only the energy of the flow within the "S-R" zone. When the sub-runner blades are propelled by the energy of the flow within the "S-R" zone, it will transfer that energy to the sub-runner shaft, and onto the sub-runner control mechanism, which will use the same transferred energy to adjust the main runner blades. In this way the main runner blades is adjusted without the need for a separate external energy source to perform main runner blade regulation.

In one embodiment, the automatic regulation, adjustment, and control by the sub-runner of the main runner blades, and the sub-runner use of the flow within the "S-R" zone energy to perform such regulation, adjustment, and control is used in combination with a secondary regulation, monitoring or control mechanism. This configuration may act to provide a backup system for regulation, monitoring, adjustment, control, or otherwise as would be understood by someone skilled in the art, of the main runner blades.

In one embodiment, the automatic regulation, adjustment, and control by the sub-runner of the main runner blades, and the sub-runner use of the flow within the "S-R" zone energy to perform such regulation, adjustment, and control acts to increase the range of water flow (or load) for which a turbine may operate.

In one embodiment, the sub-runner is installed on the main runner of a turbine during the turbine manufacturing or installation. In another embodiment, the sub-runner may be installed on the main runner of a turbine already in use in the field. In this way an existing turbine may be retrofitted to improve turbine performance.

In one embodiment, the sub-runner is used to react to and control the main runner of a wind turbine in the same way that it monitors and controls the main runner of a water turbine.

In another embodiment, depending on the general operating range of the turbine and its nominal speed, the location of the sub-runner may vary. It is however between the trailing edges of wicket gates and leading edges of the main-runner (within the "S-R", FIG. 1).

Sub-Runner Blades

In one embodiment, the turbine sub-runner comprises two sub-runner blades, configured to react to the relative flow leaving wicket gates before it enters the turbine main runner. In another embodiment, the turbine sub-runner comprises two or more sub-runner blades.

In one embodiment, the sub-runner blades are made of low density, strong, corrosion resistant materials such as but not limited to carbon steel, austenitic stainless steel, martensitic stainless steel, other stainless steel alloys, steel alloys, chromium alloys, other alloys, metal, or otherwise as would be understood by someone skilled in the art.

In one embodiment, the shape of the sub-runner blades is configured to capture the energy of the water leaving wicket gates as would be understood by someone skilled in the art.

In one embodiment, characteristics of the water flow in the space located between the downstream edges of wicket gates and leading edges of main runner blades ("S-R" zone, FIG. 1), such as the direction of the flow (as defined from the sub-runner's frame of reference) accurately indicates whether the main runner blade angles are too large or too small, when determining if the turbine is operating at optimum conditions. The sub-runner blades monitor characteristics of the within an aforementioned space, such as the direction of the flow, to provide information to the sub-runner. This information can be related to the main runner blade angles and thus the turbine operating conditions.

In one embodiment, the sub-runner has sub-runner blades fixed at its optimal set-up angle to assure sub-runner rotational speed equal to the main-runner rotational speed at the maximum turbine efficiency point. The optimal set-up angle of sub-runner blades is such that when main runner operates at its highest efficiency the sub-runner tends to spin with the same speed as the main runner ($\omega 1=\omega 2$, or $n1=n2$). When the sub-runner blade angles are set in this configuration, any deviation from this optimum operation of the turbine will cause a flow interference with the sub-runner blades, producing mechanical torque on the sub-runner shaft.

Sub-Runner Hub

The sub-runner has a sub-runner hub positioned upstream of (or above in vertical shaft turbine arrangement) the main-runner blades. The sub-runner hub is connected to, and acts to facilitate the rotation of the sub-runner shaft. The sub-runner hub is installed via a bearing interface onto the main-runner hub. The bearings used within the sub-runner hub include traditional, self-lubricating bearings, or other appropriate bearings as would be understood by someone skilled in the art.

The sub-runner blades are operatively connected to the sub-runner hub.

In one embodiment, the sub-runner hub will be made of low density, strong, corrosion resistant materials such as but not limited to carbon steel, austenitic stainless steel, martensitic stainless steel, other stainless steel alloys, steel alloys, chromium alloys, other alloys, metal, or otherwise as would be understood by someone skilled in the art.

Sub-Runner Shaft

In one embodiment, the sub-runner uses a section of main-runner hub as its shaft.

In one embodiment, the sub-runner shaft is made of low density, strong, corrosion resistant materials such as but not limited to carbon steel, austenitic stainless steel, martensitic stainless steel, other stainless steel alloys, steel alloys, chromium alloys, other alloys, metal, or otherwise as would be understood by someone skilled in the art.

In one embodiment, the sub-runner shaft is configured and positioned to be within the main runner shaft. In another embodiment, the sub-runner shaft is configured and positioned to enclose the main runner shaft within. In another embodiment, the sub-runner shaft is configured and positioned to be offset to the main runner shaft. In each of the contemplated configurations, the sub-runner hub and main runner hub will operate independently, and the operation of each shaft will be unaffected by their configuration.

In another embodiment, the configuration of the sub-runner hub and the main runner hub is such that the sub-runner hub is aided by a set of axial-lateral bearings within the main runner hub to allow the main runner and the sub-runner to spin with different speeds, while the axial relative position is fixed.

Control Mechanism

In one embodiment the control mechanism translates the differential rotational velocity ($d\omega$) of the sub-runner and main runner ($d\omega=|\omega 1-\omega 2|$) to a rotation of the main runner blades in order to change their pitch. The mechanism to execute this is (but it's not limited to) a combination of a gear system, threaded rod, cross-head and the lever arm. The rotation of the threaded rod resulting from relative rotational velocity between the main runner and the sub-runner ($d\omega=|\omega 1-\omega 2|$) acting through the aforementioned mechanism is changing angular position (blade pitch) of the runner blade.

In another embodiment, the control mechanism transfers the rotational energy of the sub-runner blades into movement that repositions the main runner blades as would be understood by someone skilled in the art.

In one embodiment, the sub-runner torque can be observed for any configuration of the sub-runner blades. The value of the sub-runner torque will depend on the shape of the blades used in the sub-runner, their location within the flow passage between trailing edges of wicket gates and leading edges of main-runner blades (zone "S-R", FIG. 1). Once these factors have been considered, the sub-runner can be designed to create sub-runner torque in the direction that coincides with the direction in which the main runner blade angle needs to be adjusted in order to optimize the turbine's efficiency. The sub-runner control mechanism may then use the sub-runner torque to adjust and control the main runner blade.

In one embodiment, the control mechanism may be used in combination with another turbine control system such as but not limited to mechanical governors, or electrical governors, digital governors, wicket gate controls, other turbine component controls, or otherwise as would be understood by someone skilled in the art. The control mechanism may act in conjunction with another turbine control system to further refine the turbine control.

The turbine sub-runner will now be described with reference to specific examples. It will be understood that the following examples are intended to describe embodiments of the turbine sub-runner and are not intended to limit the turbine sub-runner in any way.

Examples

In one embodiment as depicted in FIG. 1, the main runner 010 of a turbine will be equipped with a sub-runner 020. The main runner will have main runner blades 030 aligned along and capable of rotating about the axis 080, and rotating with a nominal speed n1 (or $\omega 1=\pi*n1/30$) around the z-axis 070. The angle between axis 080 and the z-axis 070 is approximately 75 degrees. In other embodiments, the angle between axis 080 and the z-axis 070 is between 0 degrees and 90 degrees. The turbine is also equipped with wicket gates 090 aligned along and capable of rotating about axis 095. The angle between axis 080 and axis 095 is approximately 60 degrees. In other embodiments, the angle between axis 080 and axis 095 is between 0 degrees and 90 degrees. A main runner hub 040 holds main runner blades, which may also rotate around the axis 080 to adjust the blade position for optimum turbine performance in relation to a given load. The sub-runner will have sub-runner blades 050 rotating with a nominal speed n2 (or $\omega 2=\pi*n2/30$) around the z-axis. A sub-runner hub 060 will be located upstream of the main-runner hub. As main runner blades and main runner hub are structurally attached, they rotate at the same speed as turbine nominal speed $\omega 1$ ($\omega 1=\pi*n1/30$, where n1, in rotations per minute [rpm], is the nominal speed of the main runner shaft about the z-axis). The sub-runner blades and sub-runner hub rotate about the z-axis with a speed $\omega 2$, which may be higher or lower than $\omega 1$; the nominal speed of the main-runner, depending on the relative flow of water acting upon the sub runner blades.

Figure 3:
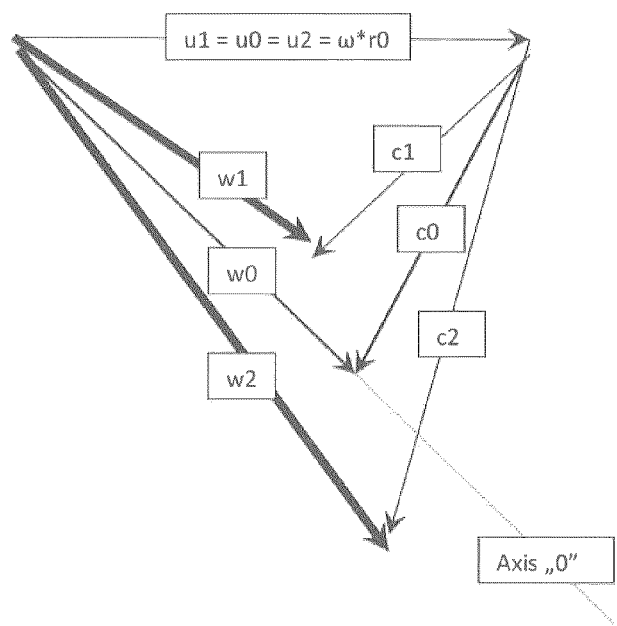
FIG. 3 illustrates a graph of the velocity vectors at the zone of interest in a rotating frame of reference (observer associated with the sub-runner).

As depicted in FIG. 3, velocity vectors are represented at the zone of interest in a frame of reference rotating with speed $\omega 2$ about the Z axis. For the relative (in rotating frame of reference) flow direction (w) along axis "0" represents condition of the best efficiency point. The sub-runner blade is formed in such a way that its reaction with the flow (within the "S-R" zone) as it occurs when wicket gates and runner blades are set in combination that assures optimal turbine performances (highest efficiency), will cause the sub-runner to rotate with the same speed as the main-runner ($n1=n2$, or $\omega 1=\omega 2$). When the direction of flow changes (is different than along axis "0") the force acting upon the sub-runner blade causes it to rotate with either higher velocity than the main-runner (situation represented by vectors w1 and c1), or lower velocity than the main-runner (situation represented by vectors w2 and c2). Therefore the mechanism transferring relative rotational movement between both runners (sub-runner and main-runner) will be designed in such a way that if the rotational velocity of sub-runner is higher that the rotational velocity of main-runner, the mechanism will cause the runner blades to increase the pitch of runner blades thus bringing the combination of wicket gates vs runner blades to its optimal value (max. possible efficiency)

It will be appreciated that, although specific embodiments of the turbine sub-runner have been described herein for purposes of illustration, various modifications may be made without departing from the spirit and scope of the invention. In particular, it is within the scope of the turbine sub-runner to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the sub-runner.

It is obvious that the foregoing embodiments of the turbine sub-runner are examples and can be varied in many ways. Such present or future variations are not to be regarded as a departure from the spirit and scope of the turbine sub-runner, and all such modifications as would be obvious to one skilled in the art are intended to be included within the scope of the following claims.

The scope of the claims should not be limited by the preferred embodiments set forth in the examples, but should be given the broadest interpretation consistent with the description as a whole.

I claim:

1. A self-regulated Kaplan or Deriaz type turbine comprising:
    a turbine power generator component;
    a main runner comprising:
    at least two main runner blades;
    a main runner hub, connected to and facilitating the rotation of the main runner blades and a main runner shaft;
    the main runner shaft connected to the at least two main runner blades and to the turbine power generator component; and
    a turbine sub-runner positioned upstream of the main runner and configured to interact with the relative flow of the vortex created by wicket gates and the main runner blades; the turbine sub-runner comprising
    a sub-runner shaft;
    a sub-runner hub connected to the sub-runner shaft;
    at least two sub-runner blades; and
    a sub-runner control mechanism, capable of transferring the rotational energy of the sub-runner into angular movement of the main runner blades.

2. A self-regulated Kaplan or Deriaz type turbine runner comprising:
    a main runner comprising:
    at least two main runner blades;
    a main runner hub, connected to and facilitating the rotation of the main runner blades and a main runner shaft;
    the main runner shaft connected to the at least two main runner blades and to a turbine power generator component; and
    a turbine sub-runner positioned upstream of the main runner and configured to interact with the relative flow of the vortex created by wicket gates and the main runner blades; the turbine sub-runner comprising
    a sub-runner shaft;
    a sub-runner hub connected to the sub-runner shaft;
    at least two sub-runner blades; and
    a sub-runner control mechanism, capable of transferring the rotational energy of the sub-runner into angular movement of the main runner blades.

3. The self-regulated Kaplan or Deriaz type turbine runner of claim 2, wherein the sub-runner shaft is a section of the main runner shaft.

4. The self-regulated Kaplan or Deriaz type turbine runner of claim 2, wherein the sub-runner shaft is positioned to be within the main runner shaft.

5. The self-regulated Kaplan or Deriaz type turbine runner of claim 2, wherein the sub-runner shaft is offset to the main.

6. The self-regulated Kaplan or Deriaz type turbine runner of claim 2, wherein the main runner hub comprises a set of axial-lateral bearings that allow the main runner and the sub-runner to spin with different speeds, while axial relative position is fixed.

7. The self-regulated Kaplan or Deriaz type turbine runner of claim 2, wherein the main runner blades are automatically regulated, adjusted and controlled by the sub-runner.

8. The self-regulated Kaplan or Deriaz type turbine runner of claim 2, wherein the main runner blades are regulated, adjusted and controlled without requiring a secondary regulation, adjustment and control mechanism.

9. The self-regulated Kaplan or Deriaz type turbine runner of claim 2, wherein a threaded interface between the sub-runner shaft and a main runner cross head, as well as axial-journal interface between main runner cross head and the sub-runner cross head facilitating angular adjustment of main runner blades and sub-runner blades.

10. The self-regulated Kaplan or Deriaz type turbine runner of claim 2, wherein the control mechanism is configured to transfer relative rotational movement between the sub-runner and the main-runner, wherein if the rotational velocity of the sub-runner is higher than the rotational velocity of main-runner, the mechanism will cause the runner blades to increase the pitch of runner blades.

* * * * *